United States Patent
Hartman

(12)
(10) Patent No.: US 6,257,007 B1
(45) Date of Patent: Jul. 10, 2001

(54) METHOD OF CONTROL OF COOLING SYSTEM CONDENSER FANS AND COOLING TOWER FANS AND PUMPS

(76) Inventor: Thomas Hartman, 9905 39th Dr. NE., Marysville, WA (US) 98270

( * ) Notice: Subject to any disclaimer, the term of this patent is extended or adjusted under 35 U.S.C. 154(b) by 0 days.

(21) Appl. No.: 09/196,382

(22) Filed: Nov. 19, 1998

(51) Int. Cl.$^7$ ............................... F25B 39/04; F25B 1/00
(52) U.S. Cl. ............................................. 62/183; 62/230
(58) Field of Search ............................. 62/230, 183, 180

(56) References Cited

U.S. PATENT DOCUMENTS

| | | | |
|---|---|---|---|
| 3,780,532 | 12/1973 | Norbeck et al. | 62/201 |
| 4,085,594 | 4/1978 | Mayer | 62/171 |
| 4,252,751 | 2/1981 | Shito | 261/26 |
| 4,282,718 | 8/1981 | Kountz et al. | 62/115 |
| 4,327,559 | 5/1982 | Spethmann | 62/179 |
| 4,474,027 | 10/1984 | Azmi et al. | 62/171 |
| 4,495,777 | 1/1985 | Babington | 62/185 |
| 4,554,964 | 11/1985 | Awano et al. | 165/39 |
| 4,589,060 | 5/1986 | Zinsmeyer | 364/148 |
| 4,932,218 | 6/1990 | Robbins | 62/171 |
| 4,936,107 | 6/1990 | Kitagaki et al. | 62/184 |
| 5,040,377 | 8/1991 | Braun et al. | 62/183 |
| 5,070,704 | 12/1991 | Conry | 62/175 |
| 5,138,844 | 8/1992 | Clanin et al. | 62/89 |
| 5,309,727 | 5/1994 | Duff et al. | 62/117 |
| 5,385,030 | 1/1995 | Kitagawa et al. | 62/160 |
| 5,425,503 | 6/1995 | Corso | 237/63 |
| 5,600,960 | 2/1997 | Schwedler et al. | 62/99 |
| 5,626,025 | 5/1997 | Hyde | 62/117 |
| 5,651,264 | * 7/1997 | Lo et al. | 62/230 |
| 5,950,439 | * 9/1999 | Peterson et al. | 62/230 X |
| 6,065,298 | * 5/2000 | Fujimoto | 62/230 |

OTHER PUBLICATIONS

"FP5—Energy Saving Inverter for Fan and Pump Applications", Saftronics Brochure, PN 027–2004, rev 12/96.
"VLC–853C3 Programmable VisualLogic Controller", Alerton Technologies Specification Sheet dated 1/97.
"H–720 High Accuracy 4–20 mA Output", Veris Industries Inc. Specification Sheet.
"Split–core kW/kWH Tranducers . . . Enercept KT™", Veris Industries Inc. Specification Sheet.

* cited by examiner

Primary Examiner—William Wayner
(74) Attorney, Agent, or Firm—Stoel Rives LLP

(57) ABSTRACT

A variable capacity compression type cooling system improves operating efficiency by modulating speed of the condenser pump motor and/or a cooling tower fan motor, in response to the loading level on the cooling apparatus. In contrast to known control strategies that rely on refrigerant gas pressure or temperature changes, the present system controls the heat rejection components in direct response to the current loading level on the cooling system. Cooling system loading is indicated, e.g,. by the current power ratio (percent of maximum) being utilized by the air conditioning compressor. The new strategy sets operation of the heat rejection components at a power setting that is a fixed ratio of the cooling system current power ratio (subject to limits). For a cooling tower, the control is applied to both the cooling tower fan(s) and the condenser pump(s). For small systems, a single variable-speed drive can be used for both the refrigerant compression device and the heat rejection component(s). The invention provides significant improvements in efficiency by reducing power consumed in operation of the various components of the system, particularly under reduced-loading conditions.

22 Claims, 6 Drawing Sheets

METHOD OF CONTROL OF COOLING SYSTEM CONDENSER FANS AND COOLING TOWER FANS AND PUMPS

TECHNICAL FIELD

This Invention pertains to the field of cooling systems of the type employed for comfort conditioning for buildings. More specifically, the present invention is directed to methods of improving the overall operating efficiency of such cooling systems, with very simple but effective speed control of the condenser pump and/or fan to reject the heat absorbed and generated by the cooling apparatus.

BACKGROUND OF THE INVENTION

Liquid chillers and direct expansion air conditioners constitute virtually all cooling systems for buildings beyond natural ventilation and evaporative cooling systems. Chillers and direct expansion air conditioners operate by absorbing heat from the space being cooled either directly (direct expansion air conditioners) or by circulating a secondary fluid (chillers). Rejecting the heat that has been absorbed and has been generated by the cooling apparatus is almost universally accomplished by transferring the heat to the environment outside the building or space. FIG. 1 illustrates the major components of typical compression cycle cooling apparatus. In this system, a motor (109), drives the compressor (110), which draws low pressure refrigerant gas from the cooler (124) through a suction line (130), compresses it, and discharges it as a higher pressure hot gas through a hot gas line (112) into the condenser (114). In the condenser, the hot gaseous refrigerant is condensed into a liquid by rejecting heat to outside air by blowing outside air across the condenser with a fan (116) driven by an electric motor (134). The condensed liquid refrigerant flows through an expansion device (122) that regulates the flow of refrigerant into the cooler also called the evaporator (124), which is held at a low pressure by the operation of the compressor. The low pressure environment causes the refrigerant to change state to a gas and as it does so, it absorbs the required heat of vaporization from the chilled water or air circulating through the cooler, entering at (135) and leaving at (136). The low pressure refrigerant vapor is drawn into the inlet of the compressor and the cycle is continuously repeated. Usually such cooling apparatus has some method of regulating cooling capacity for part load operation such as a modulating scroll or vane apparatus (111) which limits the amount of refrigerant through the compression device, or a variable speed apparatus (108) which controls the rotational speed of the compression device, or both. The chilled water or chilled air is circulated through a distribution system for comfort conditioning, or to provide cooling for certain processes within the building. In this circuit, the heat absorbed from the cooler along with the heat added by the compressor is rejected to the outside air.

FIG. 2 illustrates a compression type cooling apparatus of the same type as FIG. 1 except that it employs an evaporative cooling device to reject heat into the outside air. In this FIG., hot gaseous refrigerant enters the condenser (209) and heat is rejected such that the refrigerant condenses to a liquid. In this condenser, tepid water from the sump (211) of a cooling tower (210) is circulated through the condenser by a pump (212), and then to spray nozzles or a distribution flume (213) which distributes the water over slats or plastic fill (214) that breaks the water up into droplets with a very large surface area such that a fan (215) driven by an electric motor (216) forces air over the water, evaporating a portion of it to provide adiabatic cooling of the water. The cooler water gathers in the sump where the water lost through evaporation is made up by adding water from a water supply (217). The level of water in the tower sump is maintained by a water level sensor (218), which operates a valve (219). Water in the sump is drawn through the condenser to provide continuous rejection of the heat absorbed from the space and that generated by the cooling apparatus which functions as described in FIG. 1. In addition to compression type chillers and air conditioners that absorb heat at low temperature and rejects it at higher temperatures is the absorption type chillers and air conditions whose cycle operates differently, but employ coolers and condensers to absorb and reject heat in the same fashion as the compression type described.

It is estimated by the Electric Power Research Institute that approximately 900 billion kilowatt hours are used annually by commercial buildings in the U.S. and about 3% to 5% of that energy is expended to reject heat from air conditioning systems for commercial buildings alone.

The present state of the art employs several methods for controlling the condenser fan in the direct air-cooled systems as illustrated in FIG. 1. In many of the smaller air conditioners (such as window units), that are employed to cool rooms, single offices, or houses, the condenser fan operates continuously at full speed whenever the cooling apparatus is operating. It is also established to operate multiple condenser fans based on refrigerant pressure (U.S. Pat. No. 5,138,844), and the use of variable speed condenser fans is known to adjust flow for non-azeotropic condensers (U.S. Pat. No. 5,385,030) in response to temperature changes.

Similar temperature and pressure control strategies are known and employed to control the condensing circuits for evaporative cooled condensers (FIG. 2). This type of heat rejection is almost entirely employed in larger systems that are employed to cool commercial facilities. In these systems there are two energy consuming components in the heat rejection circuit, the condenser pump which circulates water through the condenser and cooling tower, and the tower fan which forces air over the water in the tower and provides adiabatic cooling of the water by evaporating the water into that air stream.

The present state of the art for evaporative type condenser cooling circuits involve special control for the tower fan only. It is known how to sequence two speed fans to maintain a tower water temperature setpoint (U.S. Pat. No. 4,085,594) and to control the speed of the fan to maintain the tower water temperature setpoint (U.S. Pat. No. 4,252,751 and U.S. Pat. No. 4,554,964). However, in order to assure stable chiller operation, it has been (and continues to be) strongly recommended by manufacturers of chillers that the condenser water flow be maintained at a constant rate at all chiller load conditions. Optimization of heat rejection has been limited to regimens for controlling only the tower fans. For example, U.S. Pat. No. 5,600,960 which calculates a near optimal tower leaving water temperature and operates the tower fan to maintain that temperature, and U.S. Pat. No. 5,040,377 which calculates an optimal total air flow, and operates single and multiple cooling tower fans to maintain that percent of maximum air flow. Also U.S. Pat. No. 4,474,027 employs a tower water setpoint based on the current outdoor wet bulb temperature. In all these control schemes, it is assumed that the condenser water pumps operate continuously at a single (full) speed and flow. However, I have observed that condenser pump(s) typically consume more power than the tower fan.

SUMMARY OF THE INVENTION

The purpose of this invention is to reduce cooling energy use and simplify the configuration and control of heat rejection systems. This invention provides a new, simple method of effectively controlling all the condensing heat rejection components for cooling apparatuses employing evaporative condenser heat rejection or air-cooled condensers. This invention employs one or more variable speed drives to operate all condensing components. The control strategy is to set the heat rejection components to operate at a power setting that is a fixed ratio of maximum power currently being employed by the chiller or air conditioning apparatus. For a cooling tower, this control includes the condenser pump(s) as well as the cooling tower fan(s). For a directly cooled air conditioning unit, this method includes the air-cooled condenser fan. For small systems, this method enables a single variable speed drive to operate both the refrigerant compression device and the heat rejection component(s). The general formula employed in this invention for setting the power setpoint for each condensing device is:

$$PR\text{-}SP_{cd} = C * PR_{ac}$$

Where $PR\text{-}SP_{cd}$ is the power ratio (percent of maximum) setpoint of the condensing device being controlled Where $PR_{ac}$ is the current power ratio (percent of maximum) that is being utilized by the air conditioning compressor or apparatus Where C is a selected constant The above equation has a low limit to prevent a power ratio setpoint so low all air or water flow would cease, and a high limit to ensure the power ratio setpoint would never rise above 100%.

Additional objects and advantages of this invention will be apparent from the following detailed description of preferred embodiments thereof which proceeds with reference to the accompanying drawings.

DETAILED DESCRIPTION OF PREFERRED EMBODIMENT

Figure 1:
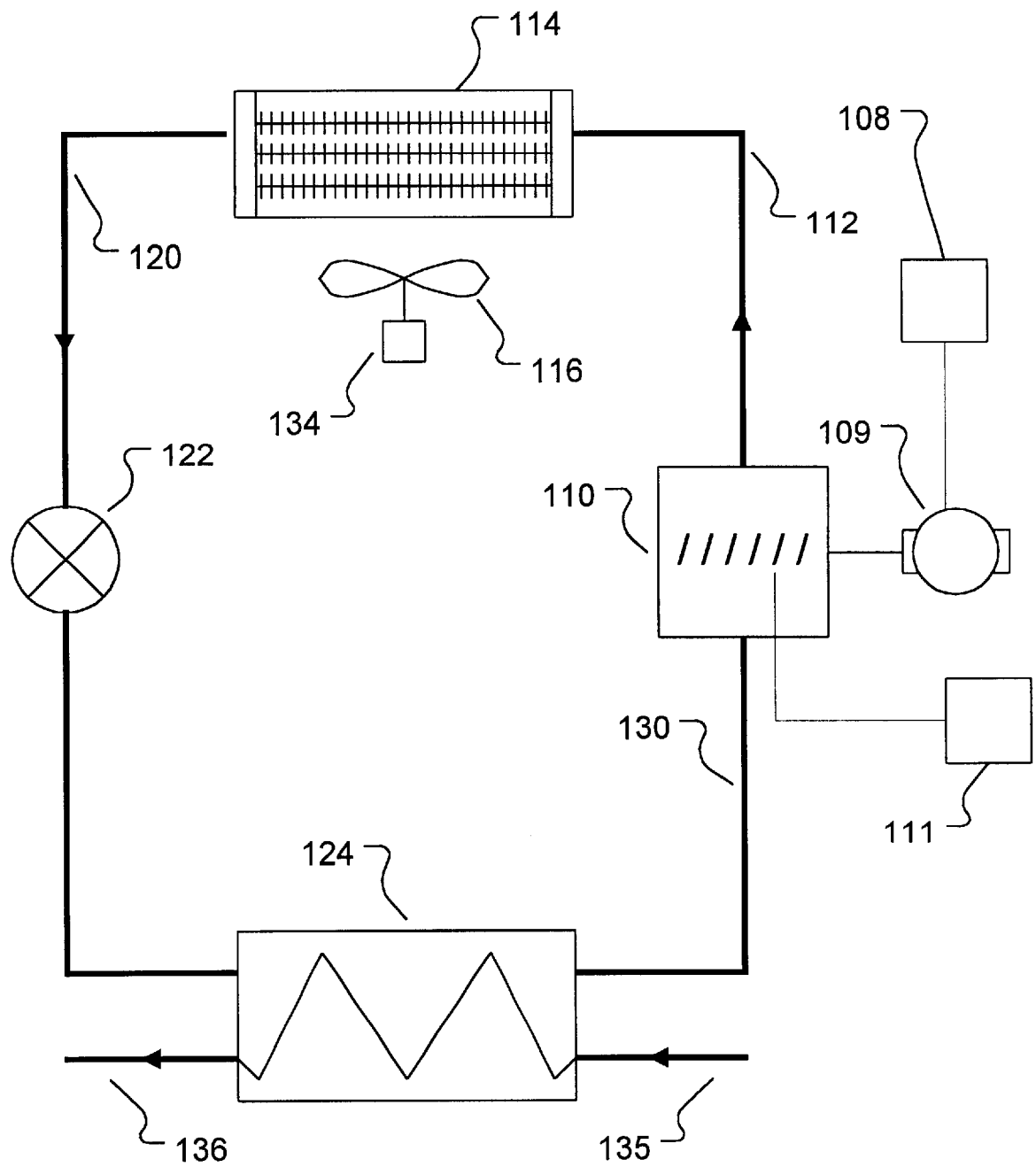
FIG. 1 is a schematic of a typical compression type air conditioning system with an air-cooled condenser.
Figure 2:
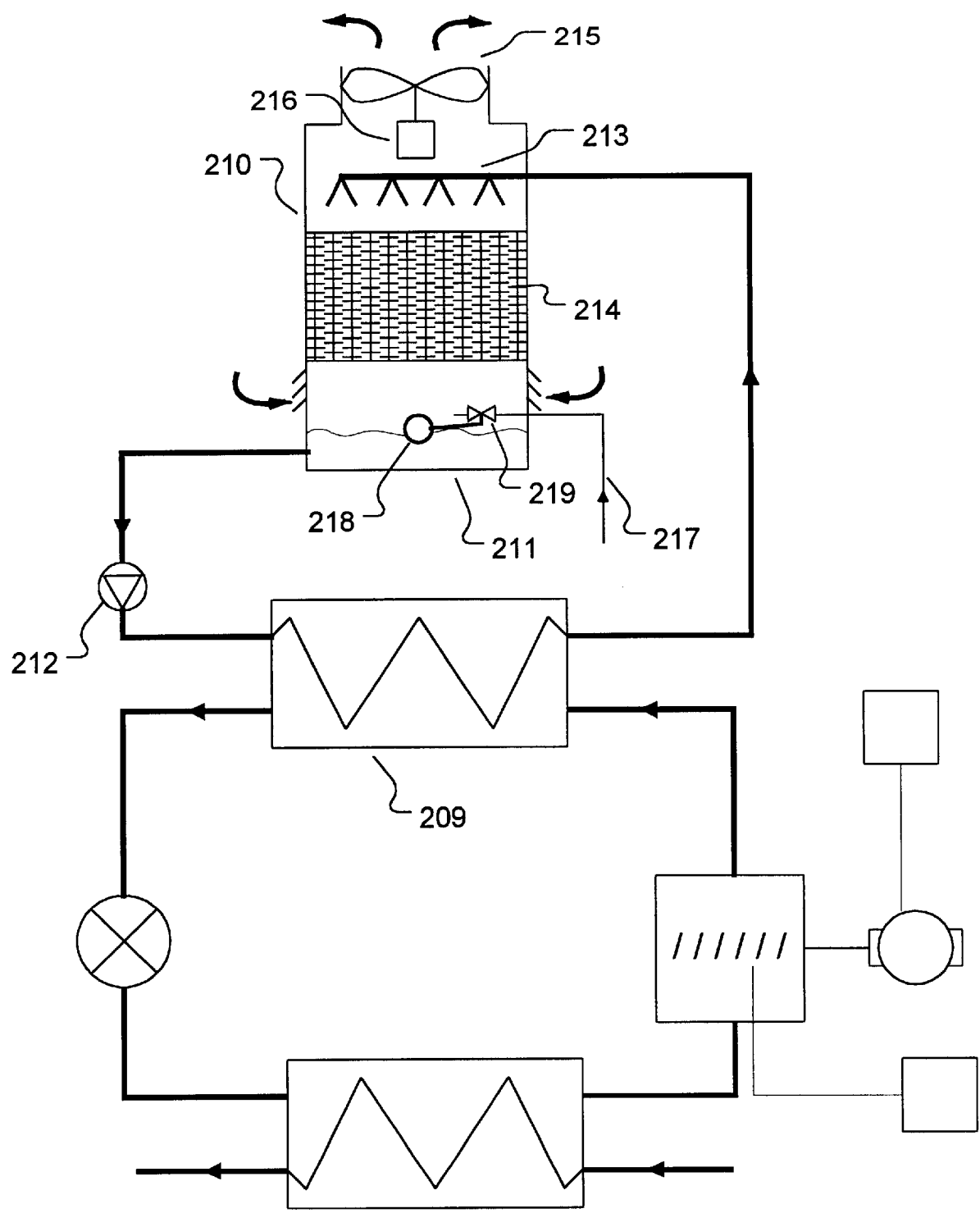
FIG. 2 is a schematic of a typical compression type air conditioning system with a water-cooled condenser and evaporative type cooling tower.
Figure 3:
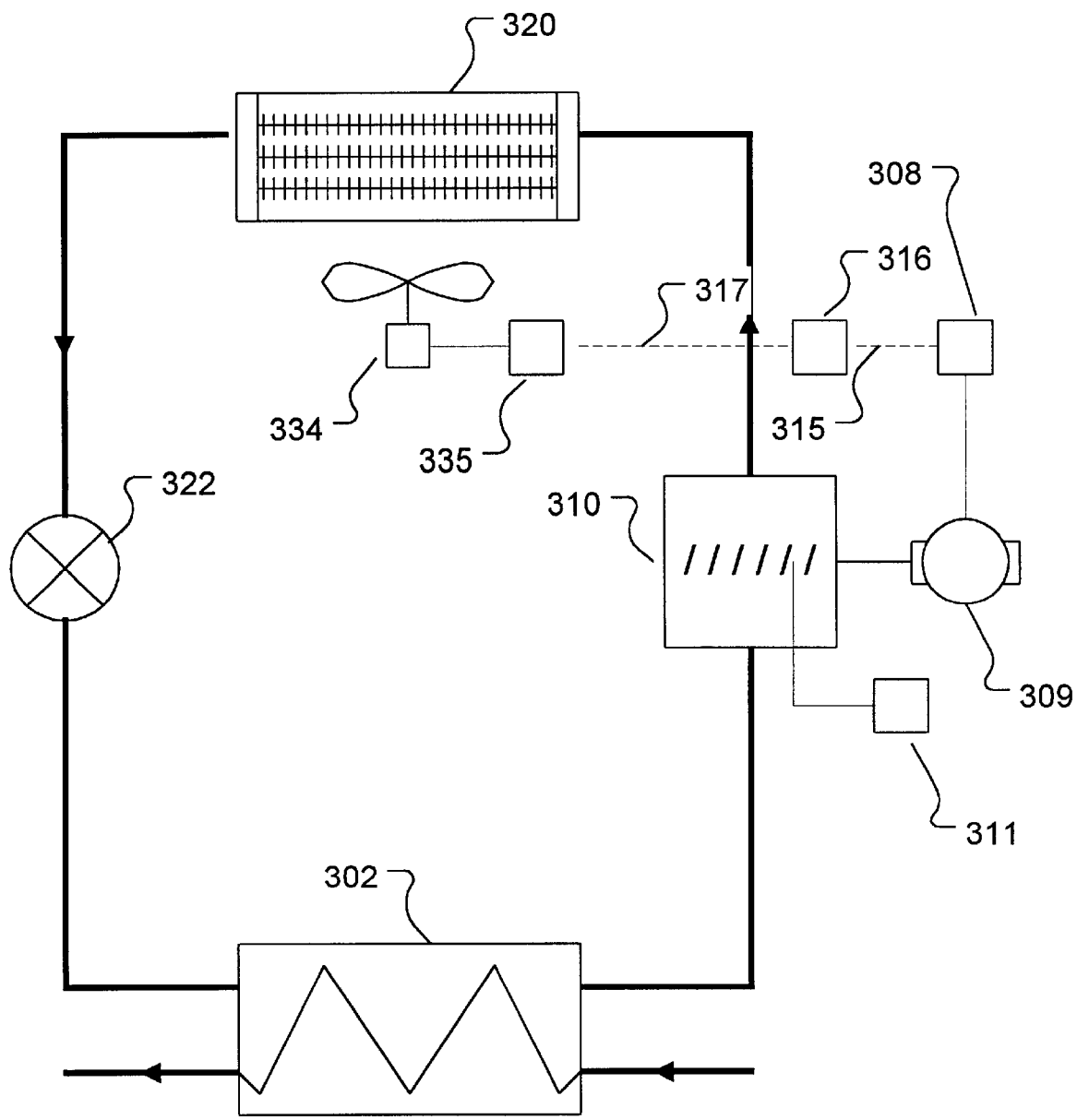
FIG. 3 is a schematic of a compression type air conditioning system with an air-cooled condenser and a variable speed condenser fan according to the present invention.

FIG. 3 illustrates one embodiment of this invention. A cooling apparatus, in this case a compressor (310) driven by an electric motor (309) employs a direct, air-cooled condenser (320). Some means of reducing the capacity of the system, either by varying the speed of the compressor with a variable speed drive (308) that controls the motor speed, or by mechanically controlling the flow of refrigerant gas through the compressor with the use of prerotational vanes, scroll dampers, or cylinder unloading (311), or a combination of both of these is employed to reduce capacity and thus power requirements of the cooling apparatus during periods of part load conditions.

The condenser fan motor (334) is controlled, for example, by a standard variable frequency drive (335), such as a Saftronics Model FP5. In this embodiment a controller (316), such as an Alerton VLC-853C3 Programmable Visual Logic Controller, monitors the present loading on the compression device either by measuring the present power using a power sensor (such as a Veris Industries Model 6300 KW Transducer, or a Veris Industries Model H-720 current transducer), or using a tachometer to measure the motor speed, or some other means from which loading can be inferred. Based on that loading signal (315), an algorithm calculates the optimum power loading for the fan and sends an output signal (317) to the variable speed drive operating the fan motor such that the fan motor operates at the optimum power percentage (or ratio) of maximum power draw based on the present percentage (or ratio) of maximum loading on the compression device.

Figure 4A:
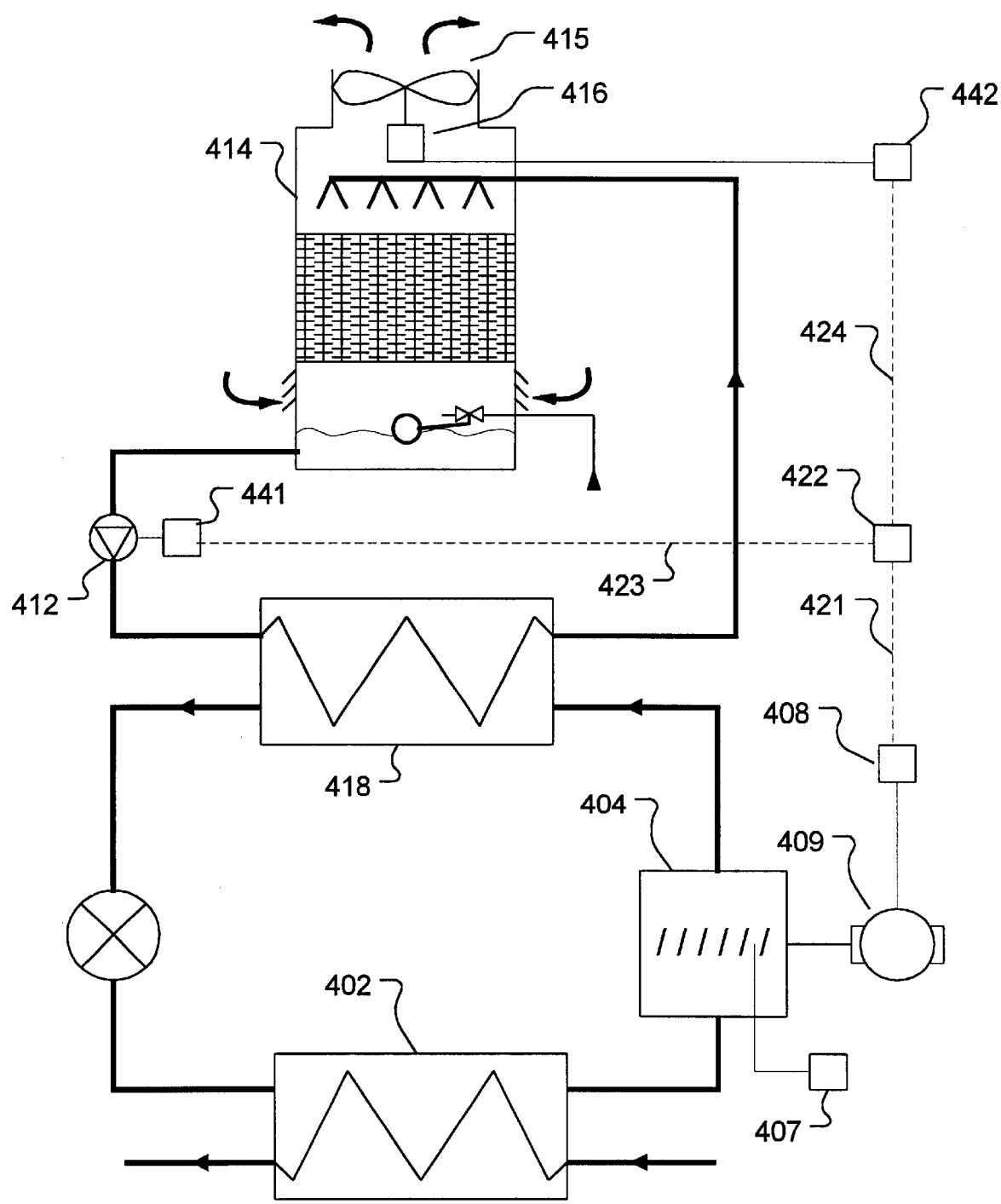
FIG. 4A is a schematic of a compression type air conditioning system with a water cooled condenser and evaporative type cooling tower utilizing variable speed control of the condenser pump and tower fans according to the present invention.

FIG. 4A illustrates a second embodiment of this invention. A cooling apparatus employs an evaporative type heat rejection apparatus. The capacity of the cooling apparatus is controllable, either by varying the speed of the compressor with a variable speed drive (408) that controls the motor speed, or by mechanically controlling the flow of refrigerant gas through the compressor (407), or a combination of both of these is employed to reduce capacity and thus power requirements of the cooling apparatus during periods of part load conditions.

Figure 4B:
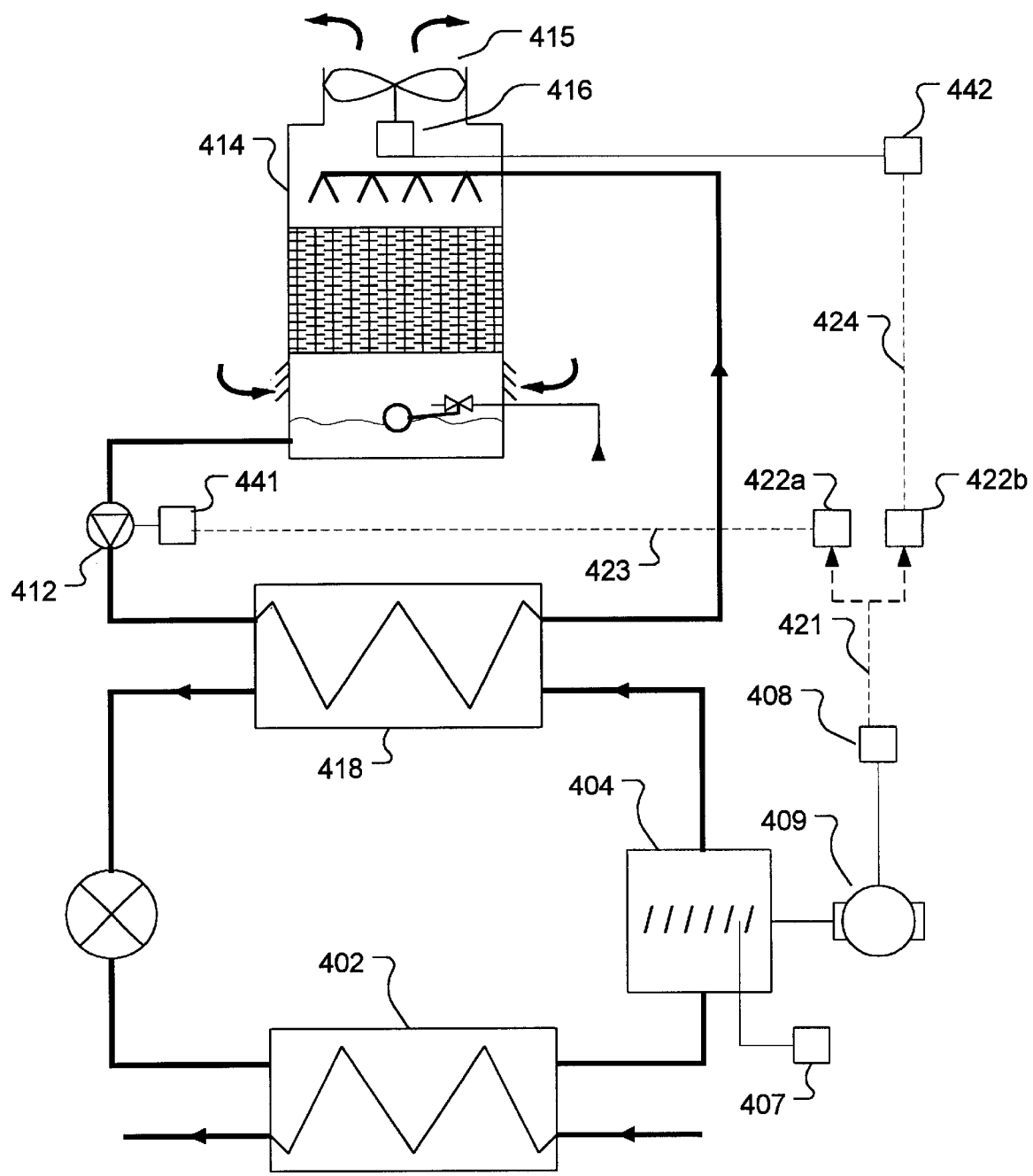
FIG. 4B illustrates an alternative embodiment of the system of FIG. 4A.

The condenser pump motor (412) and fan motor (416) are each controlled by variable frequency drives (441) and 442) respectively. In this embodiment a controller (422) monitors the present loading on the compression device either by measuring the present power consumption, or the speed, or some other means from which loading can be determined. Based on a loading signal (421), controller (422) applies a predetermined algorithm to calculate an optimum power loading level for both the condenser pump and the evaporative tower fan. The controller sends an output signal (423) to the variable speed drive operating the pump (441) and an output signal (424) to the variable speed drive operating the fan (442) such that the pump and fan operate at the optimum power percentage (or ratio) of power based on the current power percentage (or ratio) of the cooling apparatus motor (409). FIG. 4B show another embodiment in which separate controllers (422a, 422b) each receive load information from the cooling apparatus motor driver, and provide control signals to the condenser pump and the evaporative tower fan, respectively.

Figure 5:
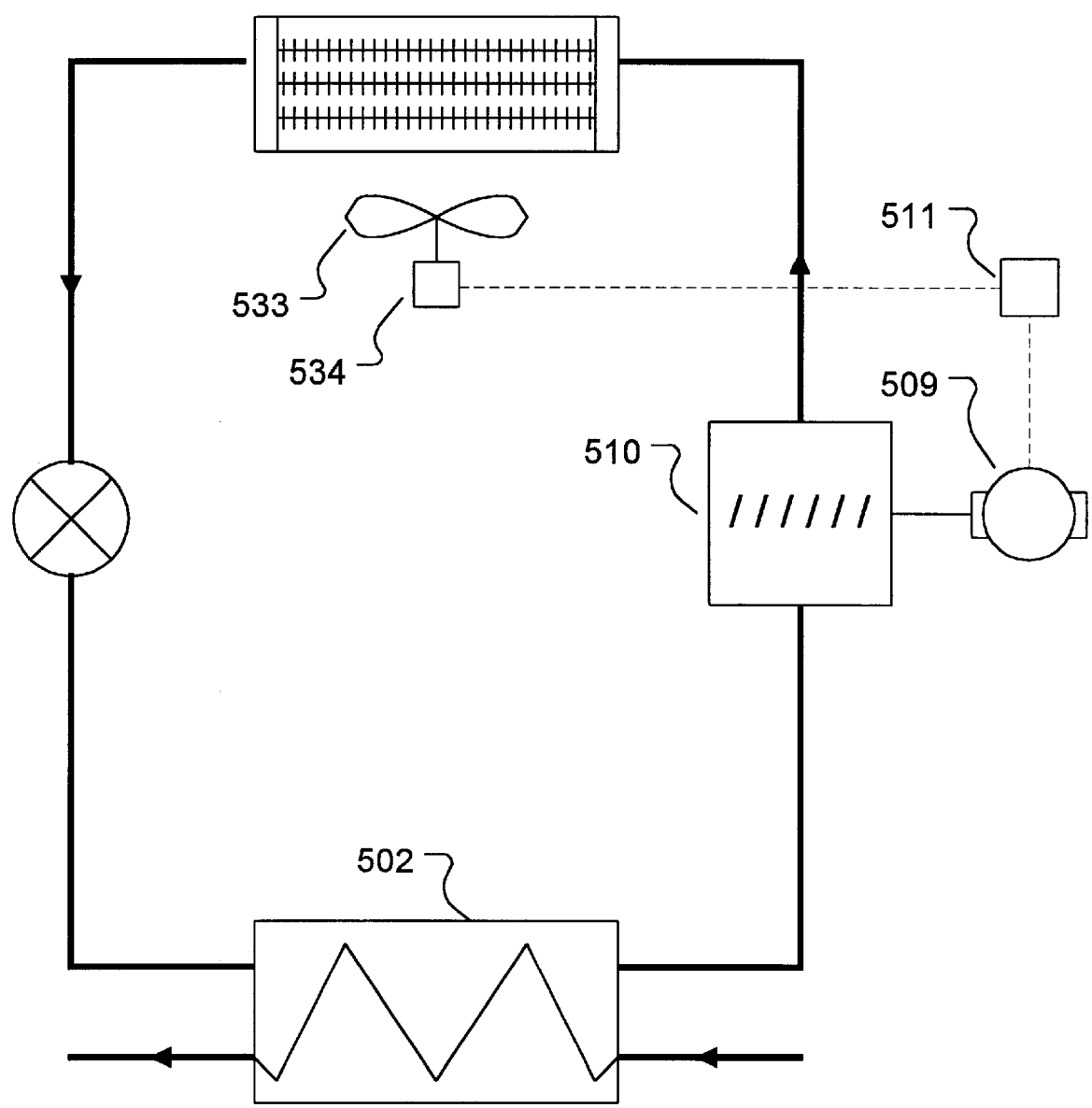
FIG. 5 is a schematic of a compression type air conditioning system with an air-cooled condenser and a variable speed drive that operates both the compressor and condenser fan according to the present invention.

FIG. 5 illustrates a third embodiment of this invention and is most suitable for smaller systems. A cooling compressor (510) is driven by an electric motor (509). The condenser fan (533) is also driven by an electric motor (534). Both the compressor motor and the condenser fan motor are operated by a single variable speed drive (511). In this embodiment both the cooling apparatus and fan(s) or pumps or both are operated by a single capacity control signal to the variable speed drive which operates all equipment in unison.

It will be obvious to those having skill in the art that many changes may be made to the details of the above-described embodiment of this invention without departing from the underlying principles thereof. The scope of the present invention should, therefore, be determined only by the following claims.

What is claimed is:

1. A variable capacity, compression type cooling system comprising:
   a heat absorbing circuit (302);
   a heat rejection circuit coupled to the heat absorbing circuit for rejecting into the environment at least a portion of heat absorbed by the heat absorbing circuit; the heat rejection circuit including:
      a compressor (310) and a motor (309) connected for driving the compressor;
      a first variable-frequency drive circuit (308) coupled to the compressor motor;
      an air cooled condenser (320);
      a variable-speed fan (334) for driving air over the air cooled condenser;
      a second variable-frequency drive circuit (335) for powering the fan motor;
      means for determining a present load (316) on the cooling; and
      means for controlling (317) the second variable-frequency drive circuit (335) in response to the present load on the cooling system so as to regulate operation of the variable-speed fan in response to the load on the compressor.

2. A variable capacity, compression type cooling system according to claim 1 wherein the compressor includes means for regulating the flow of refrigerant gas through the compressor; and the means for determining a present load on the cooling system makes that determination in response to a present state of the gas flow regulating means in the compressor.

3. A variable capacity, compression type cooling system according to claim 1 wherein the means for determining a present load on the compressor makes that determination in response to a level of power applied to the compressor motor by the first variable-frequency drive circuit.

4. A variable capacity, compression type cooling system according to claim 1 wherein the compressor includes means for regulating the flow of refrigerant gas through the compressor; and the means for determining a present load on the cooling system makes that determination in response to both a present state of the gas flow regulating means in the compressor and the level of power applied to the compressor motor by the first variable-frequency drive circuit.

5. A variable capacity, compression type cooling system according to claim 1 wherein the means for determining a present load on the compressor determines a percentage of full power applied to the compressor motor; and the means for controlling the second variable-frequency drive circuit is configured to regulate the second variable-frequency drive circuit at said percentage of full power; thereby reducing the condenser fan speed to save power while compressor loading is below maximum loading.

6. A variable capacity, compression type cooling system comprising:
   a heat absorbing circuit (402);
   a heat rejection circuit coupled to the heat absorbing circuit for rejecting into the environment at least a portion of heat absorbed by the heat absorbing circuit; the heat rejection circuit including:
      a compressor (404) and a motor (409) connected for driving the compressor;
      a first variable-frequency drive circuit (408) coupled to the compressor motor to power the compressor motor;
      a water cooled condenser (418) operatively coupled to an evaporative style cooling tower (414); the cooling tower including a variable-speed fan (416) for forcing air over the condenser, and a pump (412) for pumping cooling water through the condenser and the cooling tower;
      a second variable-frequency drive circuit (442) for powering the fan motor; means for determining a present load on the cooling system; and
      means for controlling (422,424) the second variable-frequency drive circuit (442) in response to the present load on the compressor so as to regulate operation of the variable-speed fan in response to the load on the compressor.

7. A variable capacity, compression type cooling system according to claim 6 wherein the compressor includes means for regulating the flow of refrigerant gas through the compressor; and the means for determining a present load on the compressor makes that determination in response to a present state of the gas flow regulating means in the compressor.

8. A variable capacity, compression type cooling system according to claim 6 where the means for determining a present load on the compressor makes that determination in response to a level of power applied to the compressor motor by the first variable-frequency drive circuit.

9. A variable capacity, compression type cooling system according to claim 6 where the first variable-frequency drive circuit is arranged to provide the indication of the present load level of the compressor.

10. A variable capacity, compression type cooling system according to claim 6 where the means for determining a present load on the compressor determines a percentage of full power applied to the compressor motor; and the means for controlling the second variable-frequency drive circuit is configured to regulate the second variable-frequency drive circuit at the said percentage of full power; thereby reducing the condenser fan speed to save power while system loading is below maximum loading.

11. A variable capacity, compression type cooling system according to claim 6:
   wherein the pump comprises a variable-speed pump (412) powered by a third variable-frequency drive circuit (441); and further comprising
   means for controlling (422,423) the third variable-frequency drive circuit (441) in response to the present load on the compressor so as to regulate operation of the cooling tower pump in response to the load on the compressor.

12. A variable capacity, compression type cooling system according to claim 11 wherein:
   the means for determining a present load on the compressor determines a percentage of full power applied to the compressor motor;
   the means for controlling the second variable-frequency drive circuit is configured to regulate the second variable-frequency drive circuit at the said percentage of full power; thereby reducing the condenser fan speed to save power while system loading is below maximum loading; and
   the means for controlling the third variable-frequency drive circuit is configured to regulate the third variable-frequency drive circuit at the said percentage of full power; thereby reducing the cooling tower pump speed to further save power while system loading is below maximum loading.

13. A variable capacity, compression type cooling system according to claim 6 wherein:

the second variable-frequency drive circuit is connected to power both the cooling tower pump and the fan motor, thereby regulating operation of both the variable-speed fan and the cooling tower pump responsive to loading on the compressor.

14. A method of operating a variable capacity, compression type cooling system having a heat rejection circuit including a motor connected for driving a compressor, the method comprising the steps of:

determining a present load level of the compressor based on power input to the compressor; and regulating operation of the heat rejection circuit in response to the present load level of the compressor.

15. A method according to claim 14 wherein the compressor is driven by a motor and said determining step includes acquiring an indication of the speed of rotation and torque of the motor driving the compressor.

16. A method according to claim 14 wherein the compressor is driven by a motor and said determining step includes acquiring an indication of power applied to the motor driving the compressor.

17. A method according to claim 16 wherein said acquiring an indication of power applied to the motor driving the compressor includes determining a percentage of maximum power; and said regulating operation of the heat rejection circuit includes operating the heat rejection circuit at a predetermined ratio times said percentage of maximum power.

18. A method according to claim 17 wherein the heat rejection circuit includes a water-cooled condenser and said regulating operation of the heat rejection circuit includes regulating water flow rate in the condenser.

19. A method according to claim 17 wherein the heat rejection circuit includes a water-cooled condenser having a fan and said regulating operation of the heat rejection circuit includes both regulating water flow rate in the condenser and regulating condenser fan speed.

20. A method according to claim 14 wherein the compressor is driven by a non-electric driving means and said determining step includes acquiring an indication of power delivered to the driving means.

21. A method according to claim 14 wherein the compressor is driven by a non-electric driving means and said determining step includes acquiring an indication of power delivered by the driving means.

22. A method according to claim 21 wherein acquiring an indication of power delivered by the driving means includes acquiring an indication of a speed or rotation of the compressor.

* * * * *